United States Patent [19]

Hara et al.

[11] Patent Number: 5,006,616

[45] Date of Patent: Apr. 9, 1991

[54] METATHESIS POLYMERIZED COPOLYMER

[75] Inventors: Shigeyoshi Hara; Zen-ichiro Endo; Hiroshi Mera, all of Iwakuni, Japan

[73] Assignee: Hercules Incorporated, Wilmington, Del.

[21] Appl. No.: 155,798

[22] Filed: Feb. 16, 1988

[30] Foreign Application Priority Data

Feb. 16, 1987 [JP] Japan .................. 62-31495

[51] Int. Cl.$^5$ .......................... C08F 236/20
[52] U.S. Cl. ...................... 526/75; 526/142; 526/281; 526/282; 526/283; 585/22; 585/361
[58] Field of Search ............... 526/75, 281, 282, 283, 526/142; 585/22, 361

[56] References Cited

U.S. PATENT DOCUMENTS

| 3,746,695 | 7/1973 | Ofstead | 526/75 X |
|---|---|---|---|
| 4,380,617 | 4/1983 | Minchak et al. | 526/161 |
| 4,400,340 | 8/1983 | Klosiewicz | 264/328 |
| 4,418,178 | 11/1983 | DeWitt | 525/97 |
| 4,418,179 | 11/1983 | DeWitt et al. | 525/249 |
| 4,426,502 | 1/1984 | Minchak | 526/172 |
| 4,426,506 | 1/1984 | Blanco | 526/302 |
| 4,436,858 | 3/1984 | Klosiewicz | 524/296 |
| 4,458,037 | 7/1984 | Leach | 521/124 |
| 4,469,809 | 9/1984 | Klosiewicz | 502/117 |
| 4,481,344 | 11/1984 | Newburg | 526/283 |
| 4,485,208 | 11/1984 | Klosiewicz | 524/773 |
| 4,496,668 | 1/1985 | Newburg | 521/91 |
| 4,496,669 | 1/1985 | Leach | 521/93 |
| 4,507,453 | 3/1985 | Tom | 526/283 |
| 4,520,181 | 5/1985 | Klosiewicz | 525/247 |
| 4,535,097 | 8/1985 | Newburg | 521/139 |
| 4,598,102 | 7/1986 | Leach | 521/93 |
| 4,604,408 | 8/1986 | Newburg | 521/91 |
| 4,604,447 | 8/1986 | Malpass, Jr. | 526/189 |
| 4,607,077 | 8/1986 | Silver et al. | 524/708 |
| 4,657,981 | 4/1987 | Klosiewicz | 525/211 |
| 4,661,575 | 4/1987 | Tom | 526/283 |
| 4,701,510 | 10/1987 | Minchak et al. | 526/283 |

FOREIGN PATENT DOCUMENTS

| 181640 | 5/1986 | European Pat. Off. | 526/281 |
|---|---|---|---|
| 24400 | 3/1978 | Japan | 526/281 |
| 293208 | 12/1986 | Japan | 526/281 |

Primary Examiner—Fred Teskin
Attorney, Agent, or Firm—William S. Alexander

[57] ABSTRACT

A cross-linked copolymer containing repeating units derived from a mixture comprising the following monomers:

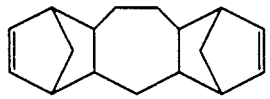

and 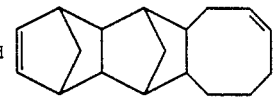

(I-a)  (I-b)

or

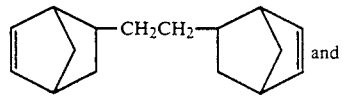 and (II-a)

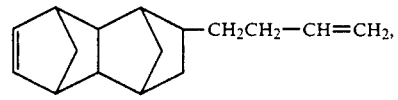

(II-b)

and occasionally other repeating units derived from other metathesis polymerizable cyclic compounds such as dicyclopentadiene, a process for producing the copolymer, a process for producing a molded article from the copolymer and a polymerizable composition therefor.

16 Claims, No Drawings

METATHESIS POLYMERIZED COPOLYMER

FIELD OF THE INVENTION

This invention relates to a metathesis polymerized cross-linked copolymer, a process for producing the copolymer, a process for producing a molded article from the copolymer, a polymerizable composition used for producing the copolymer and the molded article and a molded article produced from the copolymer.

BACKGROUND OF THE INVENTION

It is disclosed in Japanese Patent Laid Open Sho 53-24400, U.S. Pat. No. 4,400,340 and U.S. Pat. No. 4,426,502 that ring-opening polymerization of a cycloolefin containing norbornene moiety, e.g. dicyclopentadiene (called "DCP" hereinafter), in the presence of a metathesis polymerization catalyst system produces a cross-linked polymer containing olefinic groups in the main chain.

Said Japanese Patent Laid Open Sho 53-24400 is characterized by per se a new metathesis catalyst system, and in it, polymerization of DCP, etc. is accomplished in the presence of a hydrocarbon solvent. DCP polymer prepared therein is recovered from the solvent and then is used to produce a molded article. This means that DCP polymer prepared by using the catalyst system is substantially no-crosslinked non-heat-resistant thermoplastics having a low softening point.

Said U.S. Pat. No. 4,400,340 and U.S. Pat. No. 4,426,502 disclose the production of a molded article by injecting a reactive liquid mixture comprising norbornenetype monomer such as DCP and a metathesis polymerization catalyst system into a mold in which said liquid mixture is metathesis polymerized in bulk (called "RIM process" hereinafter). RIM process is a low pressure one-step or one-shot injection of a liquid mixture into a closed mold where rapid polymerization occurs resulting in a molded article. Thus, there are easily produced large-sized molded articles from DCP and the like by RIM process. The molded articles have been taken notice from the industrial point of view since they have attractive physical properties as balanced in stiffness and impact resistance. However, the molded articles produced from DCP by said RIM process have low softening points generally below 120° C., and this often limits the use of the molded articles produced from DCP, etc.

Further, Japanese Patent Laid Open Sho 61-179214 discloses metathesis copolymerization of norbornenetype cycloolefins such as DCP with other metathesis polymerizable comonomers to produce copolymers having relatively high glass transition temperatures. However, in this case, the attained increase of glass transition temperature is at most about 50° C. and is not enough.

Now, we have found that a mixture comprising the following monomers:

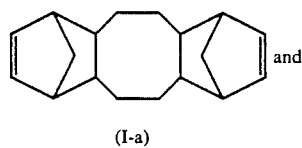

(I-a)

-continued

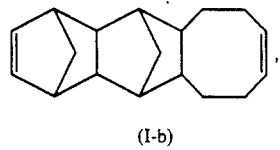

(I-b)

or a mixture comprising the following monomers:

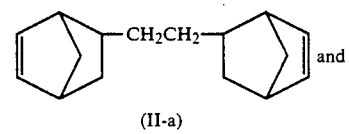

(II-a)

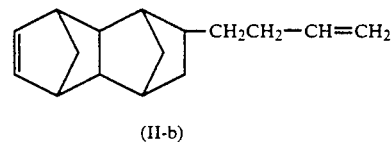

(II-b)

is readily metathesis polymerized or readily metathesis copolymerized with norbornene-type cycloalkene such as DCP to produce highly cross-linked heat resistant copolymers having a very high softening point.

The mixture comprising the monomers (I-a) and (I-b) is readily obtained as a Diels-Alder adduct of 2 moles of cyclopentadiene with 1 mole of cyclooctadiene. The monomers (I-a) and (I-b) are produced simultaneously in said Diels-Alder reaction, and have the same molecular weight, and arc not easily separable from each other by usual separation methods such as fractional distillation. Therefore, in the present invention, the mixture of the monomers (I-a) and (I-b) is used.

The mixture comprising the monomers (II-a) and (II-b) is readily obtained as a Diels-Alder adduct of 2 moles of cyclopentadiene with 1 mole of 1,5-hexadiene. The monomer (II-a) and monomer (II-b) have also the same molecular weight and are not easily separable, and are used as a mixture of them.

Cyclooctadiene and 1,5-hexadiene, the starting materials of the monomers (I-a) and (I-b) or (II-a) and (II-b), are commercially available petrochemical derivatives as well as cyclopentadiene sources.

Therefore, it is an object of the present invention to provide a highly cross-linked heat resistant metathesis polymerized copolymer which is readily and cheaply produced from petroleum products.

A further object is to provide a process for producing said copolymer. Another object is to provide a process for producing a molded article comprising the copolymer. A further object is to provide a polymerizable composition used for producing copolymer and the molded article. Another object is to provide a molded article.

SUMARRY OF THE INVENTION

The present invention relates to a metathesis polymerized cross-linked copolymer comprising:
(a) 3-100 mole % of repeating units derived from a mixture comprising the following monomers:

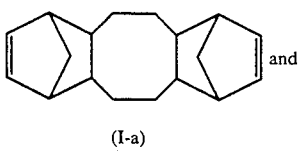

(I-a)

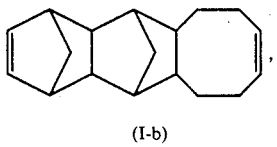

(I-b)

or a mixture comprising the following monomers:

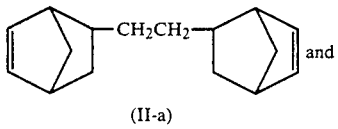

(II-a)

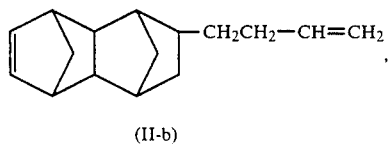

(II-b)

and (b) 97-0 mole % of repeating units derived from at least one of metathesis polymerizable cyclic compounds.

Further, the present invention relates to a process of producing the cross-linked copolymer which comprises metathesis polymerizing in the presence of a metathesis polymerization catalyst system a monomer mixture comprising:

(a) 3-100 mole % of the mixture comprising the monomers (I-a) and (I-b) or the mixture comprising the monomers (II-a) and (II-b), and (b) 97-0 mole % of at least one of metathesis polymerizable cyclic compounds.

In addition, the present invention relates to a process for producing a molded article by introducing a reactive liquid mixture which comprises 3-100 mole % of said metathesis polymerizable mixture (a) and 97-0 mole % of the cyclic compounds (b), and a metathesis polymerization catalyst system into a mold in which said liquid mixture is metathesis polymerized in bulk to produce the molded article.

The present invention further relates to a multi-part polymerizable composition, which comprises 3-100 mole % of said metathesis polymerizable mixture (a), and 97-0 mole % of the cyclic compounds (b), and the metathesis polymerization catalyst system comprising a catalyst and an activator, said catalyst and activator being not present in the same part.

The present invention further provides a molded article produced from said copolymer.

DETAILED DESCRIPTION OF THE INVENTION

In the present invention, as the comonomers (a), there is used the mixture comprising the monomers (I-a) and (I-b) (called "M-I" hereinafter) or the mixture comprising the monomers (II-a) and (II-b) (called "M-II" hereinafter) in the range of 3-100 mole %, preferably 3-80 mole %, more preferably 5-50 mole %, most preferably 10-35 mole % based on total moles of the monomers (a) and the cyclic compounds (b).

The copolymerization of at least 3 mole % of M-I and M-II with DCP provides highly cross-linked heat resistant copolymer having a high softening point, generally, of over 150° C.

For example, the copolymerization of 30 mole % of M-I with 70 mole % of DCP provides a copolymer having a softening point above 190° C., and the copolymerization of 30 mole % of M-II with 70 mole % of DCP provides a copolymer having a softening point above 170° C. In general, softening points of the copolymers of M-I or M-II with DCP are over 50° C. higher than the softening point of the original DCP homopolymer.

The monomer (I-a) contained in M-I is called 1,4,4a,5,6,6a,7,10,10a,11,12,12a-dodecahydro-1,4,7,10-dimethanodibenzo(a,e)cyclooctene (called "DDDCO" hereinafter), and the monomer (I-b) contained in M-I is called 1,4,4a,5,5a,11a,12,12a-octahydro-1,4,5,12-dimethano-5H-naphthocyclooctene (called "ODNCO" hereinafter). Both of DDDCO and ODNCO have two metathesis polymerizable cycloolefinic groups and have more bulky, rigid structure than DCP, from which it is presumed that such structural characteristics provide the copolymers with high softening temperatures.

M-I contains DDDCO and ODNCO in a molar ratio of about 1:1 when determined by gas-chromatography. On the other hand, the monomer (II-a) contained in M-II is called ethylene-bis (norbornene) (called "EBN" hereinafter), and the monomer (II-b) is called 6-butene-3-yl1,4,5,8-dimethano-1,4,4a,5,6,7,8,8a-octahydronaphthalene (called "BDON" hereinafter).

EBN has two very readily methathesis-polymerizable norbornene groups, and BDON has a bulky and rigid dimethano octahydronaphthalene group. The combination of the characteristic of EBN and BDON provides the copolymers with very high softening temperatures.

M-II contains EBN and BDON in a molar ratio of about 1:1 when determined by gas-chromatography.

In the above determination of the molar ratio, DDDCO, ODNCO, EBN and BDON can be identified by the gaschromatography mass spectrum measurement.

Among M-I and M-II, M-I is generally more preferable than M-II, since cyclooctadiene used to produce M-I is generally less expensive than 1,5-hexadiene used to produce M-II and the acyclic olefinic group contained in BDON often shows, in the metathesis polymerization, a chain-transferring function, which decreases the molecular weight of the copolymer.

It is well known that cyclopentadiene is converted spontaneously to DCP under a room temperature and DCP can decompose to cyclopentadiene when heated. Therefore, DCP may be used as a precursor of cyclopentadiene in the Diels-Alder reaction to produce M-I and M-II, in which case the Diels-Alder reaction is generally carried out at about 125°-250° C.

From the stoichiometric view point, it is presumed that the Diels-Alder reaction to produce M-I or M-II can be effectively carried out by mixing cyclopentadiene with cyclooctadiene or 1,5-hexadiene in the molar ratio of about 2:1. In this case, however, oligocyclopentadienes such as tricyclopentadiene was found to be formed predominantly with negligible amount of M-I or M-II.

Now, it was found that the use of an excessive amount of cyclooctadiene or 1,5-hexadiene, for example 5 moles of cyclooctadiene or 1,5-hexadiene per 1 mole of cyclopentadiene, was advantageous to the production of M-I or M-II.

In the practice of the invention, therefore, it is preferred that, in the production of M-I or M-II, the molar ratio of cyclooctadiene or 1,5-hexadiene to cyclopentadiene is about 10:1–1000:1.

In the present invention, M-I including DDDCO and ODNCO is produced according to the following two-steps reaction:

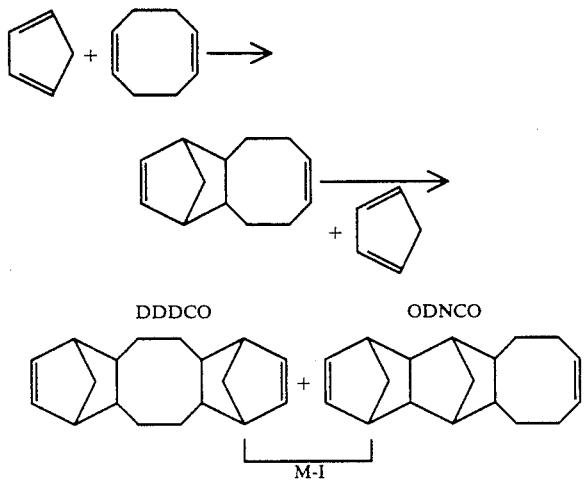

and further, M-II including EBN and BDON is produced according to the following two-steps reaction:

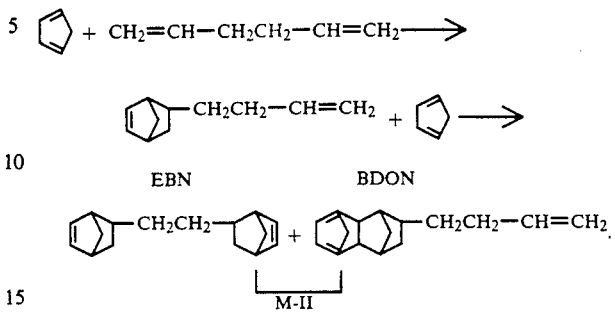

By the Diels-Alder reaction of cyclopentadiene with cyclo-octadiene or 1,5-hexadiene, there are produced 1:1 adducts of cyclopentadiene with cyclooctadiene or 1,5-hexadiene cyclopentadiene oligomers, e.g. tricyclopentadiene, tetracyclopentadiene, and the like together with the above M-I and M-II. Therefore, according to the gas-chromatography mass spectrum identification, the products by the Diels-Alder reaction of cyclopentadiene with cyclooctadiene include various compounds shown in Table 1 below and the like when not purified.

TABLE 1

| | | Number of carbon atom |
|---|---|---|
|  | cyclopentadiene | $C_5$ |
|  | cyclooctadiene | $C_8$ |
|  | DCP | $C_{10}$ |
|  | 1,4-methanol-1,4-dihydro-5H-benzocyclooctene (called "MDB" hereinafter) | $C_{13}$ |
| <br> | cyclopentadiene-trimers (called "tri-CP" hereinafter) | $C_{15}$ |

TABLE 1-continued

| | | Number of carbon atom |
|---|---|---|
| 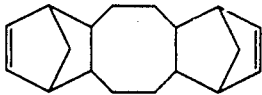 DDDCO— <br> 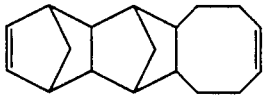 ODNCO— } M-I | | $C_{18}$ |
| Cyclopentadiene tetramer (called "tetra-CP" hereinafter) | | $C_{20}$ |
| 3:1 Adducts of cyclopentadiene and cyclooctadiene | | $C_{23}$ |

On the other hand, the products by the Diels-Alder reaction of cyclopentadiene with 1,5-hexadiene include various compounds shown in Table 2 below and the like when not purified.

and BNB, however, are metathesis copolymerizable with M-I, M-II and the like, and they may be used as comonomers in the present invention. Cyclopentadiene-oligomers, especially tri-CP and tetra-CP may also be

TABLE 2

| | | Number of carbon atom |
|---|---|---|
|  | cyclopentadiene | $C_5$ |
| $CH_2=CHCH_2CH_2CH=CH_2$ | 1,5-hexadiene | $C_6$ |
| 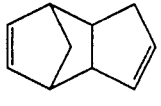 | DCP | $C_{10}$ |
| 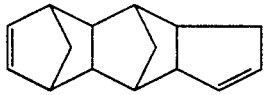 —$CH_2CH_2CH=CH_2$ | 5-(butene-3-yl)norborene (called "BNB" hereinafter) | $C_{11}$ |
| 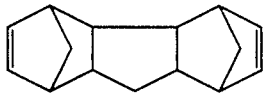 | cyclopentadiene-trimers (called "tri-CP" hereinafter) | $C_{15}$ |
| 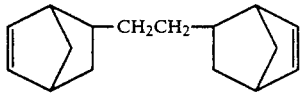 EBN— <br> 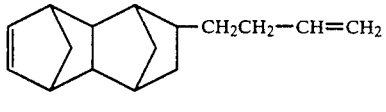 —$CH_2CH_2$—$CH=CH_2$ BDON— } M-II | | $C_{16}$ |
| Cyclopentadiene-tetramer (called "tetra-CP" hereinafter) | | $C_{20}$ |
| 3:1 Adducts of cyclopentadiene and cyclooctadiene | | $C_{23}$ |

Among of the above compounds, cyclopentadiene, cyclooctadiene, 1,5-hexadiene, DCP, MDB and BNB, which have lower boiling points than M-I and M-II, can be readily distilled off from other compound having higher boiling points, e.g. M-I, M-II and the like MDB used as comonomers when they remain unseparated.

In the metathesis polymerization of the present invention, it is preferred that M-I, M-II or monomer mixtures containing M-I or M-II contains as small polar impurities as possible, since the polar impurities having polar group such as hydroxyl-, carboxyl-, carbonyl-, peroxide groups and the like may inhibit metathesis polymerization.

In the present invention, cross-linked copolymers consisting essentially of M-I or M-II can be produced when thoroughly purified M-I or M-II is solely used. As mentioned above, however, M-I or M-II is generally produced as a mixture with unreacted starting materials such as cyclopentadiene, DCP, cyclooctadiene, 1,5-hexadiene and the like, 1:1 adducts, i.e. MDB and BNB, cyclopentadiene oligomers such as tri-CP and tetra-CP, and higher adducts, some of which are easily unseparable from M-I or M-II and are metathesis polymerizable.

From the view points of economy and process operations, therefore, DCP, cyclopentadiene-oligomers such as tri-CP and tetra-CP, MDB and BNB are preferably used with M-I or M-II as the metathesis cyclic compounds (b) in the present invention. Among of them, DCP is most preferable since it is inexpensively available as a petroleum product.

In the present invention, the metathesis compounds (b) is preferably used in the range of 97-20 mole %, more preferably 95-50 mole %, most preferably 90-65 mole %, based on total moles of the monomers (a) and the cyclic compounds (b).

It is preferred that the cyclic compounds (b) contain at least 30 mole %, preferably 50 mole %, more preferably 85 mole %, based on total moles of the cyclic compounds (b), of at least one of DCP, cyclopentadieneoligomers such as tri-CP and 1:1 adducts such as MDB or BNB. More preferably, DCP is used in at least 30 mole %, more preferably 95-50 mole % based on the total moles of the cyclic compounds (b).

Higher adducts formed in the synthesis of M-I or M-II can also be used as the cyclic compounds (b).

In the present invention, there may also be used at least one of metathesis polymerizable compounds other than above mentioned DCP, MDB, BNB, cyclopentadieneoligomers, the higher adducts and the like. Among of them are included cyclic compounds, which have at least one norbornene-moiety and are easily available as petroleum products, such as cyclopentadiene-methylcyclopentadiene codimer, ethylidene norbornene, norbornene, norbornodiene, 1,4,5,8-dimethano-1,4,4a,5,6,7,8,8a-octahydronaphthalene, 6-ethylidene-1,4,5,8-dimethano-1,4,4a,5,6,7,-8,8a-octahydronaphthalene, and 1,4,5,8-dimethano-1,4,4a-5,8,8a-hexahydronaphthalene.

As mentioned above, the copolymerization of M-I or M-II with those cyclic compounds (b) provides the copolymer with high softening points compared with the polymers produced from only the cyclic compounds (b).

In the present invention, as the cyclic compounds (b), there may also be used those having at least one of hetero atom such as oxygen, nitrogen and the like together with metathesis polymerizable cycloalkene moiety, preferably norbornene moiety.

The hetero atom forms a polar group in the structure of said cyclic compounds, and the polar group often can moderate the metathesis polymerization reaction.

Examples of the polar groups having such moderation effect preferably include ether groups, carboxylic ester groups, cyano group, N-substituted imido groups and the like.

The monomers having such polar groups are preferably used in such amount that the desired moderation effect is achieved, and generally are used in the proportion of up to 10 mole % based on total moles of the monomers (a) and cyclic compounds (b).

Examples of the cyclic compounds having the polar groups include [(5-norbornenyl)-methyl]phenyl ether, bis [(5-norbornenyl)-methyl]ether, 5-methoxycarbonylnorbornene, 5-methoxycarbonyl-5-methylnorbornene, 5-[(2-ethylhexyloxy)carbonyl]norbornene, ethylenebis(5-norbornenecarboxylate), 5-cyanonorbornene, 6-cyano-1,4,5,8-dimethano-1,4,4a,5,6,7,8,8a-octahydronaphthalene, N-butylnadic acid imide, 5-(4-pyridyl)-norbornene and the like.

Among the exmaples, 5-methoxycarbonylnorbornene, 5-methoxycarbonyl-5-methylnorbornene, 5-cyanonorbornene and N-butylnadic imide are preferred, since they are easily available.

In general, as well known, the metathesis polymerization catalyst system is composed of two components, i.e. a main catalyst component and an activator component. In the practice of bulk polymerization in the presence of the metathesis polymerization catalyst system, the activator component is first added to the monomer mixture and then the principal catalyst component is added to the mixture to initiate polymerization and finally the mixture is molded before solidified to produce a cross-linked molded articles. Alternatively, the principal catalyst component and the activator component can be added to the monomer mixture in reversed order. Further, the principal catalyst component and the activator component are simultaneously added to the monomer mixture immediately before pouring the mixture into the mold and molded articles are prepared in the same manner as the above.

The metathesis polymerization reaction, however is an exothermal reaction and proceeds very rapidly. Under such situation, the polymerization often occurs before the mixture poured into a mold, and it makes the pouring of the mixture into the mold difficult and makes the production of large sized molded articles difficult.

Accordingly, it is desirable to use a method in which the original reactive monomer solutions to be poured into the mold are separated into multi-part reactive solutions, that is, the catalyst and the activator of the metathesis polymerization catalyst system are added to individual monomer liquids to form multi-part reactive solutions, and then the multi-part reactive solutions are mixed rapidly by means of impingement-mixing (the RIM process) or by using a static mixer, and finally the mixture is immediately poured into a mold wherein it is polymerized and molded.

In this method, the multi-part reactive solutions do not need to have the same proportion of monomers each other. The proportion of the monomers may be changed freely provided that the whole proportion of the monomers is kept within the above-mentioned range. For example, when a polar monomer moderating the metathesis polymerization is used with DCP and M-I or M-II, it is preferable that the content of the polar monomer is higher in the reactive solution where the moderator can act more effectively.

As the catalyst component of the metathesis polymerization catalyst system are used salts such as halides of tungsten, molybdenum, rhenium or tantalium, preferably, tungsten and molybdenum. Particularly preferable are the tungsten compounds. Among tungsten compounds are preferred tungsten halides, tungsten oxyhalides and the like. More particularly, tungsten hexachloride and tungsten oxychloride are preferred. Organo ammonium tungstate may also be used. However, such halogen-containing tungsten compounds undesirably often initiate cationic polymerization immediately when added directly to the mixture of monomers. It is, therefore, preferable that they are previously suspended in an inert solvent such as, for example, benzene, toluene or chlorobenzene and solubilized by the addition of an alcoholic compound or a phenolic compound.

A chelating agent or a Lewis base is preferably added to the solution containing the tungsten compound in order to prevent undesirable polymerization. Those additives may include acetylacetone, acetoacetic acid, alkyl esters, tetrahydrofuran, benzonitrile and the like. About 1-5 moles of a chelating agent or the Lewis base is preferably used per one mole of the tungsten compound. However, when a polar monomer moderating the metathesis polymerization is used with DCP and M-I or M-II, the chelating agent or the Lewis base may be omitted. Under such situations, the reactive solution containing the monomers and the catalyst component of the metathesis polymerization catalyst system is kept stable sufficiently for practical use.

The activator components of the metathesis polymerization catalyst system include organic metal compounds such as alkylated products of metals of Group I - Group III in the Periodic Table, preferably, tetraalkyl tins, alkylaluminum compounds and alkylaluminum halide compounds including diethylaluminum chloride, ethylaluminum dichloride, trioctylaluminum, dioctylaluminum iodide, tetrabutyltin and the like. The activator component is dissolved in a mixture of monomers to form the other reactive solution.

According to the present invention, in principle the molded articles are produced by mixing said two reactive solutions as already described above. The polymerization reaction, however, starts so rapidly when above-mentioned composition is used, and so the undesirable initiation of polymerization often accompanied by partial gelling occurs before completion of filling of the mixed solution into the mold. In order to overcome the problem, it is preferable to use a polymerization moderating agent.

As such moderators are generally used Lewis bases, particularly, ethers, esters, nitriles and the like.

Examples of the moderators include ethylbenzoate, butyl ether, diglyme, diethyleneglycoldibutylether, benzonitrile and the like. Such moderators are generally added to the reactive solution containing the activator component.

In this case, when a polar monomer moderating the metathesis polymerization is used with DCP and M-I or M-II in the reactive solution containing the activator component, the Lewis base may also be omitted.

When a tungsten compound is used as the catalyst component, the ratio of the tungsten compound to the above-mentioned monomers is about 1000:1—about 15000:1, and preferably about 2000:1 on molar base. When an alkylaluminum compound is used as the activator component, the ratio of the aluminum compound to the above-mentioned monomers is about 100:1—about 2000:1 and preferably around a ratio of about 200:1—about 500:1 on molar base. The amount of the masking agent or the moderator may be adjusted by experiments depending upon the amount of the catalyst system.

A variety of additives may be used practically in the present invention to improve or to maintain characteristics of the molded articles. The additives include fillers, reinforcing agents, pigments, antioxidants, light stabilizers, macromolecular modifiers, flame retardants and the like. These additives must be added to the starting solutions, since they cannot be added after the solutions are polymerized to the solid molded polymer.

They may be added to either one or both of multi-part reactive solutions. The additives must be ones being substantially unreactive with the highly reactive catalyst or activator component in the solution to avoid troubles as well as not to inhibit polymerization.

If a reaction between the additive and the catalyst is unavoidable but does not proceed so rapidly, the additives can be mixed with the monomers to prepare a third solution, and the third solution is mixed with the first and/or second solutions of the multi-part solutions immediately before pouring the mixture into a mold. When the additive is a solid filler, a reactive solution containing the filler suspended in it can be used. Instead, the mold can be filled with the filler prior to pouring the reactive solutions into the mold.

The reinforcing agents and fillers can improve flexural modulus of the polymer. They include glass fibers, mica, carbon black, wollastonite and the like. The fillers whose surfaces are treated with silan coupling agent may preferably be used.

The molded articles of the invention may preferably contain an antioxidant. Preferably, a phenolor amine-antioxidant is added in advance to the polymerizable solution. Examples of the antioxidants include 2,6-t-butyl-p-cresol, N,N'-diphenyl-p-phenylenediamine, tetrakis-[methylene(3,5-di-t-butyl-4-hydroxycinnamate)]methane, methylene-4,4'-bis(3,5-di-t-butylphenol) and the like.

The polymer molded articles of the invention may also contain other polymers, which are added to the monomer solution. Among polymers, elastomers are more preferable since they increase the impact strength of the molded articles and they effectively controll the viscosity of the solution. Examples of the elastomers include styrenebutadiene rubber, polybutadiene, styrene-butadiene-styrene triblock rubber, styrene-isoprene-styrene triblock rubber, polyisoprene, butyl rubber, ethylene-propylene rubber, ethylene-propylene-diene terpolymers, nitril rubber and the like.

As described above, the polymer molded articles of the invention are preferably prepared by simultaneous molding with polymerizing, i.e. by RIM process or pre-mix process including RTM and RI process. In RIM process, two-part monomer solutions containing the catalyst and the activator respectively are rapidly mixed in the mixing head of a RIM instrument and the mixture is poured into a mold wherein it polymerizes and is molded.

In pre-mix process, two-part monomer solutions containing the catalyst component and the activator component respectively are previously mixed to prepare a pre-mixture and then the pre-mixture is introduced into a mold. In the pre-mix process, fillers such as glass fibers may be placed in the mold prior to pouring the pre-mixture, or may be added in the pre-mixture.

In both of RIM process and pre-mix process, the mixture can be introduced into the mold under relatively low pressure so that an inexpensive mold is usable. The temperature inside the mold increases rapidly by heat of the polymerization reaction so that the polymerization reaction is completed in a short time. The molded article of the invention can be removed easily from the mold without a releasing agent unlike the polyurethan-RIM process.

The surface of the molded articles of the invention has polarity probably by the oxidized layer formed on the surface so that conventional coatings such as epoxy, polyurethane and the like adhere to the surface well.

The present invention provides a variety of molded articles which include large sized molded articles such as parts of various vehicles including automobiles, motorbikes, motorboats, snowmobiles, etc. and housing of electric and electronic instruments and the like.

In the present invention, the metathesis copolymerizaton of M-I or M-II with DCP and occasionally other monomer produces highly cross-linked copolymers being highly heat-resistant based on their high softening points of, generally, over 150° C. Therefore, the molded articles produced from said copolymers are also highly heat-resistant and are practically usable in many field.

Further, because both of said M-I and M-II used in the present invention are readily and cheaply producible or available from petroleum products, the copolymers and molded articles are easily and cheaply produced. Especially, copolymers of M-I or M-II with DCP are usable in many applications.

The invention described herein is illustrated by the following examples These examples do not limit the invention.

EXAMPLES 1-5 AND COMPARATIVE EXAMPLE

[Preparation of monomers]

3000 g Of cyclooctadiene, 300 g of DCP and 2 g of hydroquinone were charged into a 10 l. autoclave purged with nitrogen and then were reacted at 180° C. for three hours. The gas-chromatography analysis of the content showed that the amount of DCP decreased to one tenth of initially charged amount of DCP. Then, fine 300 g portions of DCP were further added to the above reaction mixture in the autoclave at 180° C. at intervals of three hours over the period of 15 hours. There was prepared a mixture containing 56 wt.% of cyclooctadiene, 2 wt.% of DCP, 21 wt.% of MDB, 5 wt.% of tri-CP and 15 wt.% of M-I. The gas-chromatography analysis showed that said 15 wt.% of M-I consisted of 8 wt.% of DDDCO and 7 wt.% of ODNCO.

The mixture was then distilled under reduced pressure to distill off cyclooctadiene and DCP and to prepare a concentrated mixture containing 41 wt.% of MDB, 14% of tri-CP and 45 wt.% of M-I. The concentrated mixture was further distilled at a higher temperature under more reduced pressure to prepare a more concentrated mixture (called "Mixture- ①" hereinafter) containing 14 wt.% of tri-CP, 2 wt.% of tetra-CP and 84 wt.% of M-I. The gas-chromatography analysis showed that said 84 wt.% of M-I consisted of 46 wt.% of DDDCO and 38 wt.% of ODNCO.

[Preparation of mixed monomer solutions]

Commercially available dicyclopentadiene (DCP) was purified by distillation under nitrogen and reduced pressure to produce purified DCP with a freezing point of 33.4° C. The purity was determined by gas-chromatography to be not less than 99%.

DCP, said Mixture- ① and occasionally an other third comonomer were mixed in the weight % shown in Table 3 below to prepare mixed monomer solutions. Table 3 also shows mole % of monomers in the mixed monomer solutions together with the weight proportions of monomers.

[Preparation of solutions containing the catalyst]

20 g Of tungsten hexachloride was added to 70 ml of anhydrous toluene under nitrogen and then a solution consisting of 21 g of nonylphenol and 16 ml of toluene was added to prepare a catalyst solution containing 0.5M tungsten in terms of the metal content. The solution was purged with nitrogen overnight to remove hydrogen chloride gas formed by the reaction of tungsten hexachloride with nonylphenol. The resulting solution was used as a catalyst solution for polymerization.

With 10 ml of the above catalyst solution were mixed 1.0 ml of acetylacetone and a given amount of each of the mixed monomer solutions shown in Table 3 to prepare the first reactive solution (Solution A) containing 0.001 M tungsten in terms of the metal content.

[Preparation of solutions containing activator]

Trioctylalminum, dioctylaluminum and diglyme were mixed in the molar ratio of 85:15:300 to prepare an activator solution. The activator solution was mixed with a given amount of each of the mixed monomer solutions shown in Table 3 to prepare the second reactive solution (Solution B) containing 0.003M aluminum in terms of the metal content.

Each of 10 ml of Solution A and 10 ml of Solution B was introduced into two syringes respectively after being kept at a given temperature shown in Table 3 below and thoroughly purged with nitrogen. The solutions in each syringe were rapidly introduced into a glass-flask equipped with a stirrer and were mixed rapidly. Then, the stirrer was removed and a thermo-couple was inserted. There was measured the time at which the reaction mixture reached at 100° C. after the introduction from the syringes (called "polymerization time" hereinafter).

There was produced each of cross-linked molded articles, and it was cut into test pieces. The softening point of each test piece was measured according to the TMA method as well as the degree of swelling in toluene which is an indication of the chemical resistance of the polymer.

TABLE 3

| Example No. | Comparative Example 1 | Example 1 | Example 2 | Example 3 | Example 4 | Example 5 |
| --- | --- | --- | --- | --- | --- | --- |
| Wt. % of monomers in the mixed monomer solution (wt. %) | | | | | | |
| DCP | 100 | 84 | 57 | 36 | 79 | 78 |
| Mixture- 1 | 0 | 16 | 43 | 64 | 16 MM-1[(1)] | 16 MM-2[(2)] |
| the third comonomer | 0 | 0 | 0 | 0 | 5 | 5 |
| Mole % of monomers in the mixed monomer solutions (mole %) | | | | | | |

TABLE 3-continued

| Example No. | Comparative Example 1 | Example 1 | Example 2 | Example 3 | Example 4 | Example 5 |
|---|---|---|---|---|---|---|
| DCP | 100 | 90 | 70 | 50 | 85 | 85 |
| M-I | 0 | 8 | 25 | 41 | 8 | 8 |
| tri-CP | 0 | 2 | 5 | 8 | 2 | 2 |
| tetra-CP | 0 | 0 | 1 | 1 | 0 | 0 |
| the third comonomer | | | | | MM-1 | MM-2 |
| | 0 | 0 | 0 | 0 | 5 | 5 |
| Initial temp. when mixed (°C.) | 35 | 36 | 50 | 100 | 35 | 35 |
| Polymerization time reaching 100° C. (sec.) | 22 | 25 | 60 | 88 | 24 | 60 |
| TMA softening point (°C.) | 93 | 152 | 194 | 195 | 150 | 140 |
| Degree of swelling[3] | 1.62 | 1.73 | 1.40 | 1.39 | 1.78 | 1.75 |

[1]MM-1: 5-ethylidene-norbornene
[2]MM-2: 5-methoxycarbonylnorbornene
[3]Samples were immersed in toluene for one day. Then, the weight ratio of the swelled samples to the originals was measured.

Table 3 shows that the softening points of polymers dramatically rise with the increase of the amount of M-I copolymerized.

Table 3 also shows that the copolymerization of small amount of M-I with DCP provides the polymers with higher degree of swelling, i.e. lower degree of cross-linking of the polymers as compared with DCP homopolymer and that, on the other hand, the copolymerization of large amount of M-I with DCP provides the polymers with lower degree of swelling, i.e. higher degree of cross-linking of the polymers as compared with DCP homopolymer.

Each of 10 ml of Solution A and 10 ml of Solution B of Example 1 was introduced into two syringes respectively kept at 25° C. and thoroughly purged with nitrogen. The solutions in each syringe were injected at a constant rate into a mold of a miniature-sized RIM instrument in which nozzle the solutions were mixed. A very strong brown molded plate was produced.

5 ml Of Solution A and 5 ml of Solution B of Example 3 was mixed and stirred under nitrogen stream to prepare a pre-mixture, and then the pre-mixture was cast into a mold maintained at 90° C. A very strong brown molded plate was produced.

EXAMPLES 11-12

[Preparation of monomers]

45 g Of 1,5-hexadiene and 36 g of DCP were charged into a 200 ml autoclave purged with nitrogen and then were reacted at 190° C. for eight hours. The gas-chromatography analysis of the product showed that it was a mixture containing 16 wt.% of 1,5-hexadiene, 9 wt.% of DCP, 12 wt.% of BNB, 27 wt.% of tri-CP and 25 wt.% of M-II. The mixture was distilled under reduced pressure to prepare a mixture (called "Mixture-②" hereinafter) containing 49 wt.% of M-II and 50 wt.% of tri-CP. The gas-chromatography analysis of M-II showed that said M-II in Mixture-② contained EBN and BDON in the molar ratio of 52:48.

[Preparation of mixed monomer solutions]

Commercially available dicyclopentadiene (DCP) was purified by distillation under nitrogen and reduced pressure to produce purified DCP with a freezing point of 33.4° C. The purity was determined by gas-chromatography to be not less than 99%.

DCP, said Mixture-② and occasionally an other third comonomer were mixed in the weight % shown in Table 4 below to prepare mixed monomer solutions. Table 4 also shows mole % of monomers in the mixed monomer solutions together with the weight proportion of monomers.

Reactive Solutions A and B were prepared according to the same procedures as Examples 1-5 under using the same catalyst solution and the same activator solution as used in Examples 1-5.

Cross-linked molded articles were produced by mixing Solution A and Solution B and then molding the mixture in the same manner as Examples 1-5.

Polymerization time, TMA softening point and degree of swelling of the molded articles were measured in the same manners as Examples 1-5. The results are shown in Table 4 below.

TABLE 4

| Example No. | Example 6 | Example 7 | Example 8 | Example 9 | Example 10 | Example 11 | Example 12 |
|---|---|---|---|---|---|---|---|
| Wt. % of monomers in the mixed monomer solution (wt. %) | | | | | | | |
| DCP | 0 | 15 | 11 | 41 | 36 | 61 | 86 |
| Mixture- 2 | 100 | 85 | 86 | 59 | 57 | 39 | 14 |
| | | | MM-1[1] | | MM-3[3] | | |
| the third comonomer | 0 | 0 | 3 | 0 | 7 | 0 | 0 |
| Mole % of monomers in the mixed monomer solutions (mole %) | | | | | | | |
| DCP | 0 | 20 | 15 | 50 | 45 | 70 | 90 |
| M-II | 50 | 40 | 40 | 25 | 25 | 15 | 5 |
| tri-CP | 50 | 40 | 40 | 25 | 25 | 15 | 5 |
| | | | MM-1 | | MM-3 | | |
| the third comonomer | 0 | 0 | 5 | 0 | 5 | 0 | 0 |
| Initial temp. when mixed (°C.) | 35 | 35 | 35 | 35 | 35 | 35 | 35 |
| Polymerization time reaching 100° C. (sec.) | 30 | 31 | 28 | 30 | 27 | 26 | 23 |
| TMA softening point (°C.) | 180 | 199 | 189 | 186 | 186 | 174 | 169 |

TABLE 4-continued

| Example No. | Example 6 | Example 7 | Example 8 | Example 9 | Example 10 | Example 11 | Example 12 |
| --- | --- | --- | --- | --- | --- | --- | --- |
| Degree of swelling[3] | 1.50 | 1.41 | 1.43 | 1.31 | 1.35 | 1.43 | 1.50 |

(1)MM-1: 5-ethylidene-norbornene
(2)MM-2: methylcyclopentadiene-cyclopentadiene codimer Table 4 shows that the copolymerization of M-II with DCP provides the copolymers with dramatically rised softening points and decreased degrees of swelling even if a small amount of M-II is copolymerized with DCP.

EXAMPLES 13-14

45 g Of 1,5-hexadiene and 5 g of DCP were charged into a 200 ml autoclave purged with nitrogen and then were reacted at 180° C. for three hours.

The gas-chromatography analysis of the content showed that the amount of DCP decreased to one tenth of initially charged amount of DCP.

Then fine 5 g portions of DCP were further added to the above reaction mixture in the autoclave at 180° C. at intervals of four hours over the period of 20 hours.

Among of said two sets of reactive solutions, one set consisted of 100 wt.% of Mixture- ③ (Example 13) and the other set consisted of 10 wt.% of Mixture- ③ and 90 wt.% of DCP (Example 14).

Cross-linked molded articles were produced by mixing Solution A and Solution B and then molding the mixture in the same manner as Examples 1-5.

The molded article of Example 13 had the softening point of 190° C., and the molded article of Example 14 had the softening point of 151° C.

There was prepared a mixture containing 33 wt.% of 1,5-hexadiene, 17 wt.% of BNB, 1 wt.% of tri-CP and 49 wt.% of M-II. The gas-chromatography analysis of M-II showed that M-II contained EBN and BDON in the molar ratio of 52:48.

The mixture was then distilled under reduced pressure to distill off compounds having low boiling point and to prepare a concentrated mixture (called "Mixture- ③ " hereinafter) containing 97 wt.% of M-II and 3 wt.% of tri-CP.

Two sets of Reactive Solutions A and B were prepared according to the same procedures as Examples 1-5 under using the same catalyst solution and the same activator solution as used in Examples 1-5.

What we claim is:

1. A process of producing a cross-linked copolymer, which comprises metathesis polymerizing in the presence of a metathesis polymerization catalyst system a monomer mixture comprising:
   (a) 3-100 mole % of a mixture comprising the following monomers:

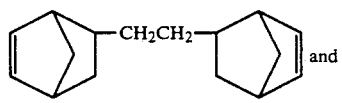

(II-a)

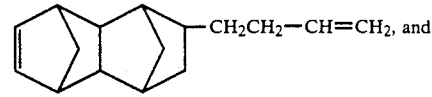

(II-b)

(b) 97-0 mole % of at least one of metathesis polymerizable cyclic compounds.

2. A process of claim 1 in which the content of the monomers (II-a) and (II-b) is 3-80 mole %.

3. A process of claim 2 in which the content of the monomers (II-a) and (II-b) is 5-50 mole %.

4. A process of claim 1 in which the cyclic compounds (b) contain at least 30 mole %, based on total moles of the cyclic compounds (b), of at least one of dicyclopentadiene, cyclopentadiene-oligomers and 1,4-methano-1,4-dihydro-5H-benzocyclooctene.

5. A process of claim 4 in which the content of at least one of dicyclopentadiene, cyclopentadieneoligomers and 1,4-methano-1,4-dihydro-5H-benzocyclooctene is at least 50 mole %, based on total moles of the cyclic compounds (b).

6. A process of claim 5 in which the content of dicyclopentadiene is 95-50 mole % based on total moles of the cyclic compounds (b).

7. A process of claim 1 in which the mixture comprising (II-a) and (II-b) is derived from a reaction product produced by subjecting a mixture of cyclopentadiene and 1,5-hexadiene in a molar ratio of about 2:1 to a heat treatment under conditions wherein Diels-Alder addition reaction occurs.

8. A process of claim 7 in which dicyclopentadiene is used as a precursor of cyclopentadiene.

9. A multi-part polymerizable composition, which comprises metathesis polymerizable monomers comprising:
   (a) 3-100 mole % of a mixture comprising the following monomers:

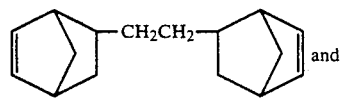

(II-a)

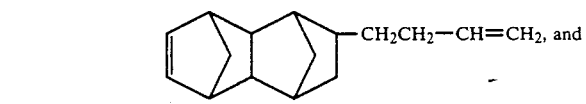

(II-b)

(b) 97-0 mole % of at least one of metathesis polymerizable cyclic compounds; and a metathesis polymerization catalyst system comprising a catalyst and an activator, said catalyst and activator being not present in the same part.

10. A composition of claim 9 in which the content of the monomers (II-a) and (II-b) is 3–80 mole %.

11. A composition of claim 10 in which the content of the monomers (II-a) and (II-b) is 5–50 mole %.

12. A composition of claim 9 in which the cyclic compounds (b) contain at least 30 mole %, based on total moles of the cyclic compounds (b), of at least one of dicyclopentadiene, cyclopentadiene-oligomers and 1,4methano-1,4-dihydro-5H-benzocyclooctene.

13. A composition of claim 12 in which the content of at least one of dicyclopentadiene, cyclopentadieneoligomers and 1,4-methano-1,4-dihydro-5H-benzocyclooctene is at least 50 mole %, based on total moles of the cyclic compounds (b).

14. A composition of claim 13 in which the content of dicyclopentadiene is 95–50 mole % based on total moles of the cyclic compounds (b).

15. A composition of claim 9 in which the mixture comprising (II-a) and (II-b) is derived from a reaction product produced by subjecting a mixture of cyclopentadiene and 1,5-hexadiene in a molar ratio of about 2:1 to a heat treatment under conditions wherein Diels-Alder addition reaction occurs.

16. A composition of claim 15 in which dicyclopentadiene is used as a precursor of cyclopentadiene.

* * * * *

UNITED STATES PATENT AND TRADEMARK OFFICE
CERTIFICATE OF CORRECTION

PATENT NO. : 5,006,616
DATED : April 9, 1991
INVENTOR(S) : Shigeyoshi Hara, Zen-ichiro Endo and Hiroshi Mera It is certified that error appears in the above-identified patent and that said Letters Patent is hereby corrected as shown below:

In the Abstract of Disclosure, monomer (1-b) is incorrect.

"  " should read " 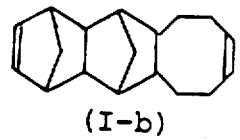 ";

(I-b)                    (I-b)

Col. 4, line 34, "3-yl1," should read "3-yl-1,";

Col. 7, line 68, "like MDB" should read --like.  MDB--;

UNITED STATES PATENT AND TRADEMARK OFFICE
CERTIFICATE OF CORRECTION

PATENT NO. : 5,006,616

DATED : April 9, 1991

INVENTOR(S) : Shigeyoshi Hara, Zen-ichiro Endo and Hiroshi Mera

It is certified that error appears in the above-identified patent and that said Letters Patent is hereby corrected as shown below:

Col. 12, line 41 , "styrenebutadiene" should read --styrene-butadiene--;

In the Claims, Col. 18, line 34, "95-50 mole %" should read "98-50 mole %"; and

Col. 20, line 4, "95-50 mole%" should read "98-50 mole %".

Signed and Sealed this

Third Day of August, 1993

*Attest:*

MICHAEL K. KIRK

*Attesting Officer*  *Acting Commissioner of Patents and Trademarks*